Feb. 11, 1969  C. N. DE BRUIN  3,427,014
PISTON RING EXPANDER
Filed Jan. 10, 1967                                   Sheet 1 of 2
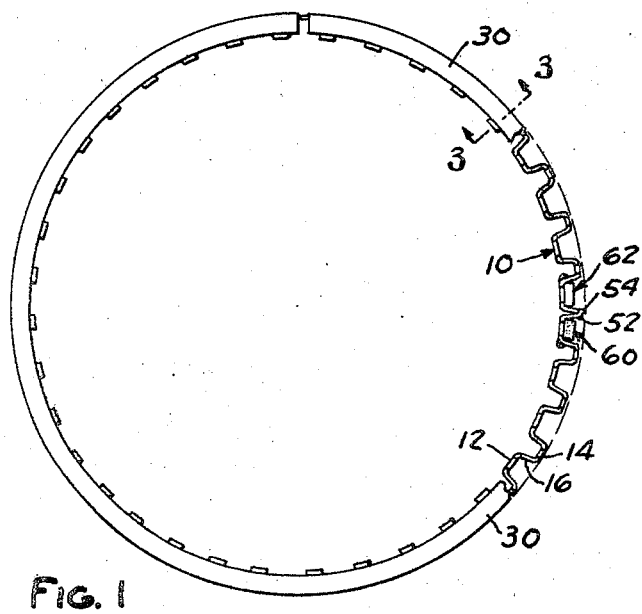
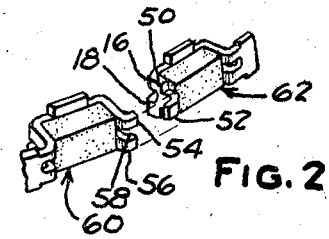
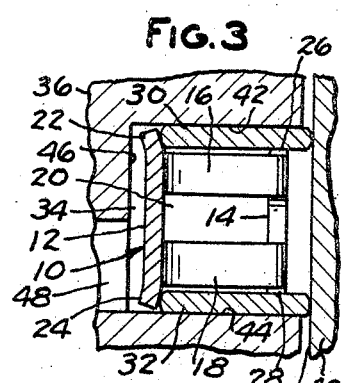
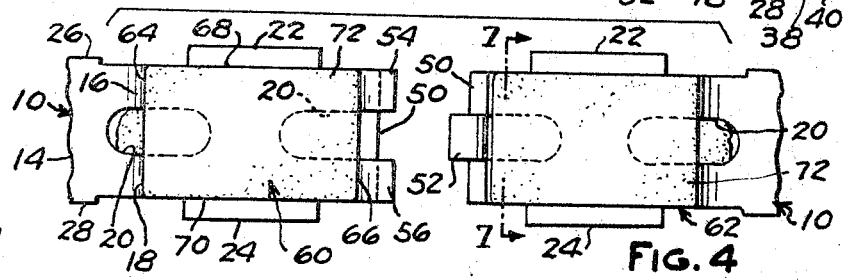
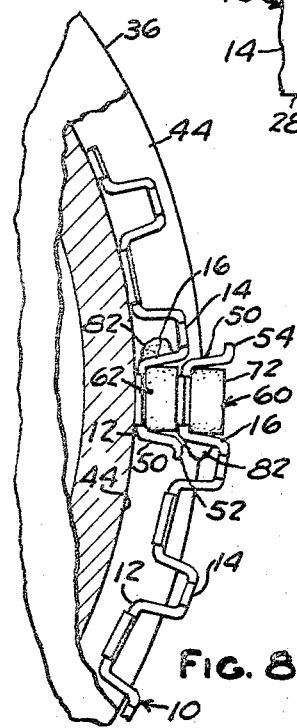
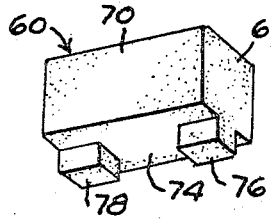
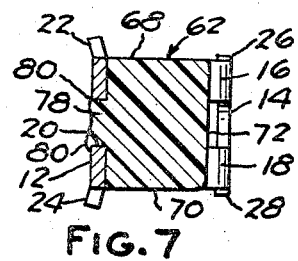
INVENTOR.
CALVIN N. DE BRUIN
BY
Barnes, Kisselle, Laisch & Choate
ATTORNEYS

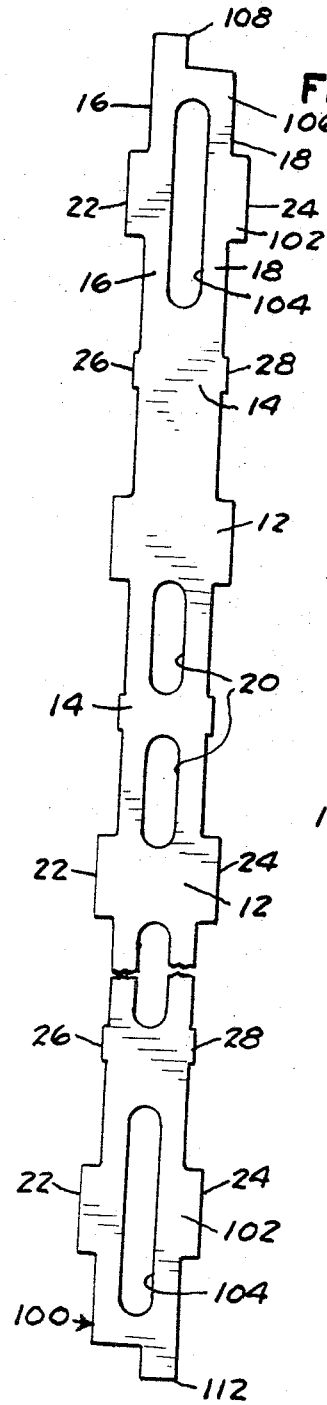
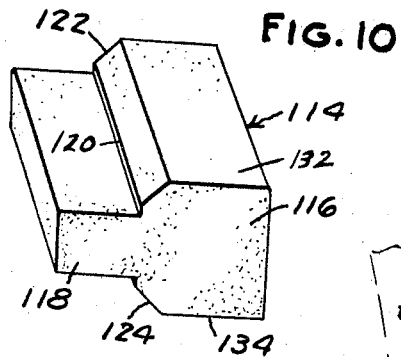
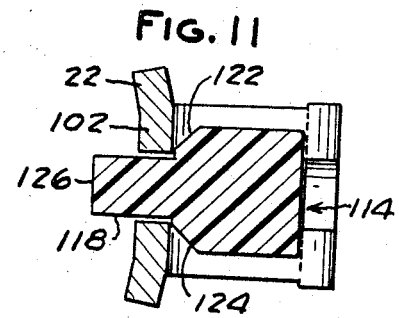
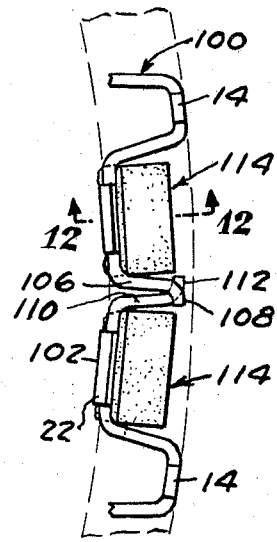
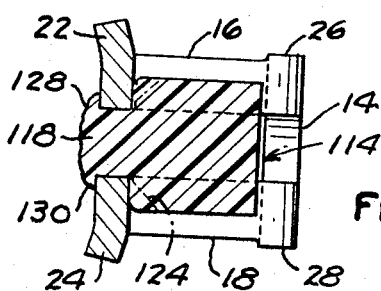

United States Patent Office 3,427,014
Patented Feb. 11, 1969

3,427,014
PISTON RING EXPANDER
Calvin N. De Bruin, Muskegon, Mich., assignor to Sealed Power Corporation, Muskegon, Mich., a corporation of Michigan
Filed Jan. 10, 1967, Ser. No. 608,337
U.S. Cl. 267—1.5                8 Claims
Int. Cl. F16f 1/34, 9/36; F16j 15/00

ABSTRACT OF THE DISCLOSURE

A radially corrugated split expander-spacer for a piston oil ring assembly having a pair of anti-nesting inserts mounted one in each of the end corrugations of the expander-spacer to prevent nesting of the end corrugations should the same become circumferentially overlapped.

---

This invention relates to an improved expander-spacer for use in a piston oil ring assembly.

The expander-spacer of the present invention is a circumferentially compressible spring member of the radially corrugated type which is split to form parted ends. For purposes of illustration herein, an expander-spacer of the type disclosed in United States Olson Patent 2,789,872 has been selected. In the operative condition of the expander-spacer, after it has been installed in the oil ring groove of the piston in back of the oil sealing rings or rails of the oil ring assembly, the ends circumferentially abut one another so that the expander is radially self-supporting and need not bottom against the back or innermost wall of the groove. The expander-spacer serves to hold the sealing rings in a predetermined compressive outward engagement with the wall of an internal combustion engine cylinder bore for oil control purposes.

If the sealing rings or rails are not held in proper engagement with the cylinder wall, loss of oil control will result in excessive oil consumption. This condition may occur with the Olson oil ring or others employing similar radially corrugated expanders because the terminal ends of the expander are capable in many instances of being overlapped during assembly of the rails and expander-spacer, and during installation of this ring assembly in the oil ring groove of a piston due to the radial clearance between the oil ring and the bottom of the oil ring groove. This condition may not be apparent after installation of the oil ring on the piston. Such overlapping decreases the effective diameter of the expander-spacer and often leads to nesting in the other end corrugation, thus hooking the ends of the expander-spacer together so that it is essentially locked in this defective condition. As a result an insufficient outward force is exerted by the oil ring against the cylinder wall, resulting in excessive oil consumption which in turn causes fouled spark plugs, blue exhaust smoke, loss of power, etc.

One object of the present invention is to provide an improved expander-spacer for an oil ring having an improved terminal end construction which prevents nesting of the ends of the expander should they become overlapped.

A further object is to provide an expander-spacer for an oil ring assembly adapted to indicate to the assembler the fact that an oil ring contains an overlapped expander-spacer even after the oil ring has been assembled on a piston.

A further object of the present invention is to provide an expander-spacer for an oil ring assembly of the aforementioned type which, if overlapped after installation on the piston, is effective to prevent assembly of such piston in the cylinder bore of the engine.

Other objects, features and advantages of the present invention will become apparent from the following detailed description taken in conjunction with the accompanying drawing wherein:

FIG. 1 is a plan view of an oil ring assembly containing an expander-spacer constructed in accordance with the present invention, a portion of the upper rail of the assembly being broken away to better illustrate the expander-spacer.

FIG. 2 is an enlarged fragmentary perspective view illustrating the terminal ends of the expander-spacer of FIG. 1 with the ends spaced from one another.

FIG. 3 is a fragmentary further enlarged vertical section through a piston and associated cylinder showing the expander-spacer of the invention and associated rails as installed in the oil ring groove of the piston, this view being taken on the line 3—3 of FIG. 1.

FIG. 4 is a fragmentary elevational view illustrating the anti-nesting inserts of the present invention mounted adjacent terminal ends of the expander-spacer with the ends separated from one another as in FIG. 2.

FIG. 5 is a perspective view of an anti-nesting insert of the present invention shown by itself prior to installation in the expander-spacer.

FIG. 6 is a fragmentary elevational view illustrating one of the terminal ends of the expander-spacer as viewed from inside the expander-spacer with the anti-nesting insert installed therein.

FIG. 7 is a vertical section taken on the line 7—7 of FIG. 4.

FIG. 8 is a fragmentary plan view of the expander-spacer illustrating the same installed in the oil ring groove of the piston with the terminal ends overlapped as may occur during assembly of the expander-spacer on the piston.

FIG. 9 is a fragmentary plan view of a flat strip of stainless steel or other sheet metal material after die blanking but before bending into a modified form of expander-spacer of the present invention.

FIG. 10 is a perspective view of a modified form of anti-nesting insert of the present invention shown by itself prior to installation in the expander-spacer of FIG. 9.

FIGS. 11 and 12 are vertical radial sectional views through the insert of FIG. 10 and expander-spacer of FIG. 9, taken on line 12—12 of FIG. 13, respectively illustrating the insert during assembly thereof on the expander-spacer and after being secured thereto.

FIG. 13 is a fragmentary plan view of the abutted ends of the expander-spacer of FIG. 9 with two of the modified anti-nesting inserts of FIGS. 10–12 installed thereon.

Referring in more detail to the drawing, FIG. 1 shows a dual rail oil ring assembly including an expander-spacer 10 which is a generally circular radially corrugated spring parted at one side with circumferentially abutting ends at the parting. Expander-spacer 10 is, by way of example, similar to that disclosed in United States Olson Patent 2,789,872 except for the novel anti-nesting construction provided at the abutting terminal ends of the expander-spacer as described in more detail subsequently herein. Thus expander 10 is preferably made from a strip of stainless steel which is radially corrugated intermediate its ends to form a series of circumferentially extending and alternating inner and outer crowns 12 and 14 which are interconnected by generally radially extending upper and lower legs 16 and 18 (FIG. 3), the legs being axially separated by oil drainage slots 20. Each inner crown 12 has a pair of lips 22 and 24 extending axially one from each of the opposite longitudinal edges thereof and inclined slightly inwardly which bear against the inner peripheries of rails 30 and 32 respectively (FIG. 3). Each outer crown 14 has a pair of shorter pads 26 and 28 extending respectively one from each of the opposite longitudinal edges thereof which bear against the facing sides of rails 30 and 32 adjacent the outer periphery thereof to maintain the same axially spaced apart.

Expander-spacer 10 is thus adapted for assembly with rails 30 and 32 in an oil ring groove 34 of a piston 36 (FIG. 3) and serves to force rails 30 and 32 radially outwardly into oil scraping engagement with the wall 38 of a cylinder structure 40 of an internal combustion engine, and to force the rails axially apart into side-sealing engagement with the top and bottom walls 42 and 44 of grove 34. One or more openings 48 are provided in the back wall 46 of groove 34 for draining the oil picked up by rails 30 and 32 into the interior of the piston for return to the crankcase.

The circumferentially abutting terminal ends of expander-spacer 10 (FIGS. 1 and 2) each consist of a pair of the legs 16 and 18 and a radially extending connecting plate portion 50 which abuts its counterpart in the operative correctly assembled condition of the oil ring assembly as shown in FIG. 1. In addition, the terminal ends may have a known interlocking alignment structure such as a centrally disposed tongue 52 joined integrally to portion 50 of one end and bent to extend circumferentially of the expander-spacer toward the other end, and a pair of axially spaced tongues 54 and 56 similarly joined to portion 50 of the other end and bent to extend circumferentially toward tongue 52. Tongues 54 and 56 define a notch 58 therebetween adapted to receive tongue 52 and thereby interdigitally lock the ends when brought into abutment as in FIG. 1. Although such tongue and notch interlocking joint structure is helpful in maintaining the abutting ends in properly aligned abutting relationship, nevertheless it is still possible for the ends to disengage from one another and become radially misaligned. One end may then circumferentially overlap the other end during assembly of rails 30 and 32 on the expander-spacer or during installation of the oil ring assembly in the oil ring groove of the piston. In the case of a radially corrugated expander-spacer such as the aforementioned Olson type, this usually results in the previously described nesting problem, e.g., inner crown 12 of the overlapping end seating against the inner crown 12 of the overlapped end.

In accordance with the present invention, such nesting is prevented by the provision of at least one, but preferably two identical anti-nesting inserts 60 and 62 mounted one in each recess formed by the radial corrugation closest to the terminal ends of the expander-spacer (FIGS. 1, 2, 4, 7 and 8). In the exemplary embodiment shown herein, insert 60 comprises a rectangular block of plastic material (FIG. 5) having a lengthwise dimension between its end faces 64 and 66 slightly less than the circumferential distance between radial portion 50 and the adjacent legs 16 and 18 which, together with the endmost inner crown 12, define the endmost radial corrugation so that inserts 60 and 62 just fit between these radial portions of the endmost corrugations of expander-spacer 10. The axial dimension of inserts 60, 62 between the top and bottom faces 68 and 70 thereof is less than the minimum axial spacing between rails 30 and 32 and preferably is equal to or less than the axial dimension between the upper edge of leg 16 and the lower edge of leg 18 so as to leave a clearance between the faces 68 and 70 and the respectively adjacent rails 30 and 32. The radial dimension between the outer and inner faces 72 and 74 of the insert is equal to or less than the radial distance between the outer face of inner crown 12 and the maximum outside diameter of expander-spacer 10 so that the inserts are flush with or, as shown herein, recessed radially slightly inwardly from the outer periphery of the expander-spacer.

Each insert 60 and 62 preferably has mounting means formed integrally therewith for securing the same to the expander-spacer. In the case of expander-spacer 10, which is of the aforementioned Olson type having two oil drainage openings 20 extending toward one another partially into the sides of each inner crown 12 (FIGS. 4 and 6), two mounting lugs 76 and 78 are integrally provided on the back face 74 of each insert arranged to project into each opening 20 so that the lugs 76 and 78 flank inner crown 12 when the insert is pushed into fully seated relation against the outer face of crown 12 in the endmost corrugation. Preferably lugs 76 and 78 are dimensioned to have a press fit in openings 20 to thereby frictionally retain inserts 60, 62 temporarily in place until the same are permanently affixed to the expander-spacer.

In accordance with a further feature of the present invention, by applying heat, as with a gas flame or heated iron or roll, to the inner face of inner crown 12 of the endmost corrugation, lugs 76 and 78 are fused to secure the insert to the inner crown. Preferably, lugs 76 and 78 are made long enough to project through and extend beyond the inner face of crown 12 to provide sufficient fusible material so that when heat is applied to partially melt the lugs the molten or semi-molten material runs along the upper and lower edges of the openings 20 and over onto the back face of the inner crown and legs as indicated at 80 in FIGS. 6 and 7. Also, sufficient fusible material is available so that by directing the flame or moving the heat applying implement away from the terminal end and circumferentially of the expander-spacer toward the adjacent outer crown 14, the molten material is urged to flow away from the end so that the excess runs into the recess behind outer crown 14 to form a relatively large glob 82 (FIG. 6) integral with lug 76' and the adjacent end face 64 of the insert. This leaves very little fused material projecting inwardly beyond the inner face of inner crown 12. The heat is then removed to allow the semi-liquid material to cool and re-solidify, thereby forming the fused lugs 76' and 78' and anchoring mass 82 which adhesively and mechanically lock the insert to the expander-spacer so that the inserts are very securely retained on the same.

With inserts 60, 62 thus mounted one in each endmost corrugation of exapnder-spacer 10, it can no longer become locked up as a result of nesting of the endmost corrugations. As illustrated in FIG. 8, should the terminal ends 50 of the expander-spacer slip out of their properly abutting, radial aligned and interlocked relationship shown in FIG. 1 and become radially misaligned and overlapped as shown in FIG. 8, the endmost corrugations cannot nest with one another due to the overlapped insert, i.e., insert 62 in FIG. 8, filling up the recess formed by the overlapped corrugation so that inner crown 12 of the overlapping corrugation bears against outer face 72 of insert 62. Hence the overalpping corrugation is held radially outwardly of insert 62, whereupon the overall radial thickness of the expander-spacer at the overlapped joint is almost twice the normal radial thickness of the expander-spacer. This dimensional "stack-up" is considerably in excess of the maximum radial dimension of groove 34. Thus, the pressure of rails 30, 32 acting on expander-spacer 10 will cause the overlapped corrugation to bottom or bear against the back wall 44 of groove 34 as shown in FIG. 8, and the rails in turn will be forced radially outwardly an excessive distance from the outer circumference of the piston. This excessive "pop-out" of the rails caused by insert 62 thus visually indicates to the assembler that the ring assembly is defective. Also, the defective ring assembly can be detected by attempting to manually "spin" in its groove. If overlapped it will be difficult to move circumferentially in its groove due to the frictional drag of the bottomed inner crowns against the back wall 44 of the groove. Should the defective installation still go unnoticed, the excessive protrusion of the rails will prevent a piston equipped with the defective ring assembly from being installed in the engine because the outside diameter of the rails will exceed bore diameter and insert 62 will prevent contraction of the rails to the diameter required for insertion into the cylinder bore of the engine. Thus the defective ring assembly will be caught at this point where it can be remedied at little cost compared to the amount of time and labor required to get at the source of trouble after the engine has been assembled to running condition.

It is to be understood that inserts 60, 62 may have a shape other than rectangular as shown herein. For example, they can be cut from cylindrical rod stock and retained by a press fit between end 50 and legs 16, 18 by having an excessive lengthwise dimension. In this case anchoring lugs 76 and 78 may be omitted, and the ends of the rods partially melted down to weld or solder into the oil drainage openings 20. Although it is feasible to use a purely mechanical lock of the inserts to the expander-spacers, it is preferred to combine the mechanical and "fused in situ" features described previously in order to provide a secure anchoring of the inserts in the corrugations.

Preferably inserts 60, 62 are made of a material which has a relatively low melting point, for example approximately 300° F. minimum, but its melting point should be above the temperatures which the insert normally encounters in operation of the engnie, which in most automotive engines will not exceed about 250° F. Suitable materials for this purpose are plastics such as nylon, polyethylene, tetrafluorethylene polymers, commonly known as "Teflon," trifluorochloroethylene polymers, commonly known as "Kel-F," etc., although metal such as solder can also be used.

It is also to be understood that inserts 60, 62 may be employed in expanders or expander-spacers having end corrugations reversed from that shown herein, i.e., wherein the endmost crowns are outer crowns rather than inner crowns.

A modified anti-nesting insert 114 and expander-spacer 100 for use with such insert is shown in FIGS. 9–13 inclusive. FIG. 9 illustrates expander-spacer 100 in its die blanked flat strip form prior to bending, whereas FIG. 13 illustrates the terminal end corrugations of expander-spacer 100 after bending to final form. These terminal corrugations comprise an inner crown 102 having a circumferentially extending slot 104 (FIG. 9) which runs circumferentially from a point about midway between the outer crown 14 adjacent inner crown 102 about the middle of the radial extending end portion 106, slot 104 thus being about twice as long as slots 20. The interlocking end structure of expander-spacer 100 comprises radial portion 106 and a tongue 108 extending circumferentially therefrom, offset axially to one side of the longitudinal center line of the expander-spacer, and the corresponding radial portion 110 at the other end of the expander-spacer which has a similar tongue 112 offset axially on the opposite side of the center line of the expander-spacer. Tongues 108 and 112 thus circumferentially overlap one another when portions 106 and 110 are brought into abutment as shown in FIG. 13.

A pair of modified anti-nesting inserts 114 are mounted one in each of the end corrugations as best seen in FIG. 13. Insert 114 may be extruded from rod stock to form a strip having the final cross-sectional configuration, and then cut into proper lengths to form the individual inserts. As shown in FIG. 10, insert 114 has a rectangular body portion 116 with one continuous rib 118 extending perpendicular from the back face 120 of the insert. The rear corners of body 116 are chamfered to form beveled surfaces 122 and 124 respectively adjacent the upper and lower surfaces of rib 118. Rib 118 is dimensioned for insertion in slot 104 with a slight clearance between its upper and lower sides as best seen in FIG. 11 and to project beyond the back face of inner crown 102 by about half the radial dimension of the rib.

Insert 114 may be anchored to expander-spacer 100 during installation by positioning a heated implement against or spaced slightly from the back face of inner crown 102 so that when the insert is forced rib-first into the end corrugation face 126 of rib 118 contacts this implement prior to the insert being fully seated in the position shown in FIG. 11. As rib 118 is forced against the implement, it is heated until it deforms to the configuration shown by way of example in FIG. 12, the material of the rib thus being fused and re-solidified to form anchoring portions 128 and 130 which overlap against the back face of inner crown 102 around the margin of slot 104 and thereby secure insert 114 to expander-spacer 100. Any excess material from the heat and pressure deformation or rib 118 flows into the space provided therefor between surfaces 122 and 124 and the adjacent outer face of inner crown 102 as best seen in FIG. 12, the chamfering of the rear corners of body 116 thus insuring that this material does not project excessively beyond upper and lower surfaces 132 and 134 of the insert.

Inserts 114 when mounted as described above in expander-spacer 100 are effective to prevent nesting of the overlapped end corrugations in the same manner as previously inserts 60 and 62, but inserts 114 are preferred since they are less expensive to manufacture and are easily installed by automatic machinery.

I claim:

1. A non-bottoming type split expander for a piston ring assembly having a plurality of corrugations for imparting a compressive outward force against a ring of the assembly, said expander having a pair of circumferentially abutting terminal ends with one of said corrugations disposed adjacent each of said ends, and a pair of anti-nesting inserts mounted on said expander one in each of said end corrugations, said inserts extending in a radial direction to substantially prevent nesting of said end corrugations when the same are circumferentially overlopped, said expander having at least one opening in each of said end corrugations extending between inner and outer surfaces of said corrugation, each of said inserts having mounting means inserted in said opening of the associated end corrugation and engaging said end corrugation to mechanically secure the inserts at least temporarily on said expander.

2. The expander as set forth in claim 1 wherein said mounting means of each of said inserts comprises an anchoring projection heat fusible only above piston ring operating temperature, said anchoring projection being interlocked with the associated corrugation by fused and re-solidified portion of said projection.

3. The expander as set forth in claim 1 wherein said end corrugations of said expander each have a circumferentially extending crown portion and a second opening extending between said surfaces, said first and second openings forming a pair of circumferentially extending slots terminating at their mutually adjacent ends in each of said crown portions, and each of said inserts has a second projection, said first and second projections of each insert projecting into said first and second openings of the associated corrugation in flanking relation to said crown portion thereof.

4. The expander as set forth in claim 1 wherein said projections each have a portion overlapping the one of said surfaces which is remote from said insert to thereby secure the inserts to said expander.

5. The expander as set forth in claim 4 wherein said inserts are made of heat fusible material and said overlapping portion of each said projection comprises a fused and re-solidified portion of said projection.

6. The expander as set forth in claim 4 wherein each of said inserts is made of a heat fusible material and said overlapping portion of each of said projections is disposed in the one of said corrugations disposed adjacent the associated end corrugation in which said insert is mounted, said overlapping portion comprising a fused and re-solidified portion of the associated projection and being larger in cross-section than said opening and being joined to the material of said insert in said end corrugation by the material of said associated projection extending therebetween via said opening.

7. The expander as set forth in claim 4 wherein each of said end corrugations is made up of a circumferentially extending crown portion and first and second generally radially extending flexing portions integrally joined to the opposite end edges of said crown portion, each of said openings comprising a circumferentially extending slot centrally disposed in the associated crown portion and extending circumferentially of said crown portion and into the associated first and second radial portions, each of said inserts comprising a block of material extending between said first and second radial portions of the associated corrugation adjacent said crown portion thereof and having a rib projecting radially therefrom through said slot of the associated corrugation.

8. The expander as set forth in claim 7 wherein each of said inserts has a generally rectangular body portion with oppositely inclined surfaces converging toward said rib portion thereof, said inserts being made of a heat fusible material, and wherein said overlapping portions of each of said projections comprises a fused and re-solidified portion of said rib, the space between said inclined surfaces and the adjacent face of said associated crown portion containing excess fused and re-solidified material from said rib portion.

References Cited

UNITED STATES PATENTS

| | | | |
|---|---|---|---|
| 2,789,872 | 4/1957 | Olson | 277—139 |
| 3,105,695 | 10/1963 | Burns et al. | 277—79 |
| 3,124,364 | 3/1964 | Burns et al. | 277—139 X |
| 3,166,331 | 1/1965 | Warrick | 277—139 |
| 3,338,582 | 8/1967 | DeBruin | 277—139 X |
| 3,346,252 | 10/1967 | Saylor | 277—139 X |

SAMUEL ROTHBERG, *Primary Examiner.*

JEFFREY S. MEDWICK, *Assistant Examiner.*

U.S. Cl. X.R.

277—2, 139, 160